April 7, 1925.

L. O. CULVER

FASTENING DEVICE FOR JAR TOPS

Filed Oct. 15, 1923

Witnesses:
Virgil L. Mares
George A. Gruss

Inventor
Lewis O. Culver
By Joshua R. H. Potts
his Attorney

Patented Apr. 7, 1925.

1,532,585

UNITED STATES PATENT OFFICE.

LEWIS O. CULVER, OF WEST PITTSTOWN, PENNSYLVANIA.

FASTENING DEVICE FOR JAR TOPS.

Application filed October 15, 1923. Serial No. 668,547.

*To all whom it may concern:*

Be it known that I, LEWIS O. CULVER, a citizen of the United States, residing at West Pittstown, in the county of Luzerne and State of Pennsylvania, have invented certain new and useful Improvements in Fastening Devices for Jar Tops, of which the following is a specification.

My invention relates to devices for fastening tops to jars and more particularly to adjustable devices whereby the pressure on the jar tops may be varied.

The objects are to provide an adjustable fastening device which will positively hold the top to the jar in any adjusted position; which is easily operated to fasten or unfasten the top and which may be readily attached.

Figure 1:
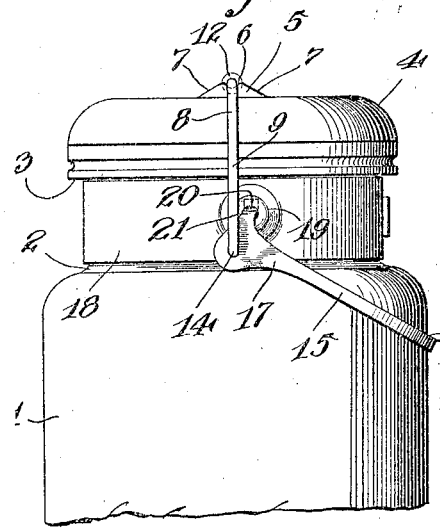
Figure 3:
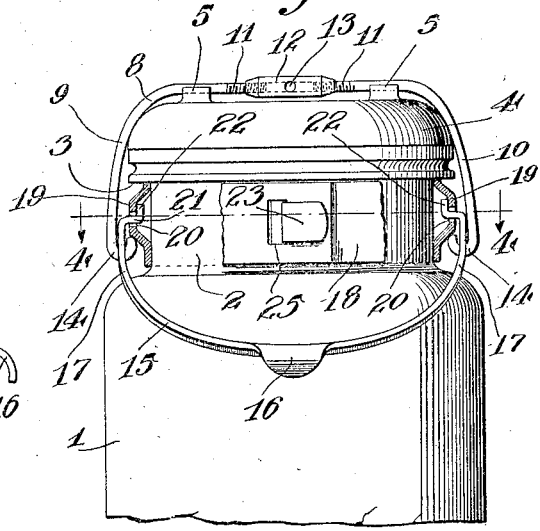
Figure 2:
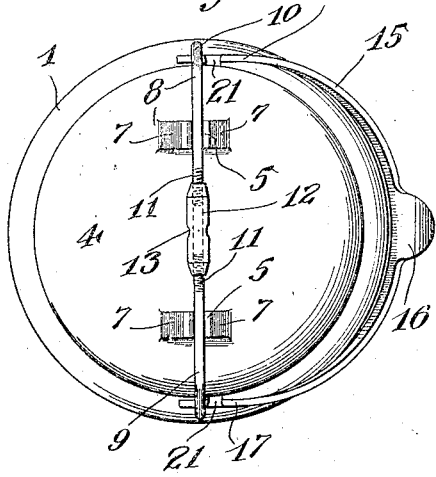
Figure 4:
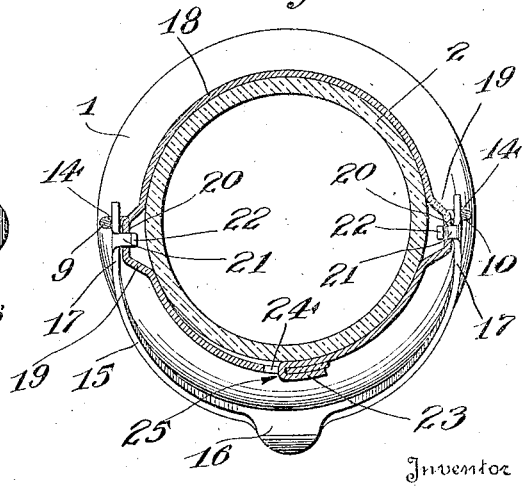

These objects, and other advantageous ends which will be described hereinafter, I attain in the following manner, reference being had to the accompanying drawings in which Figure 1 is a fragmentary side elevation of a jar and top having my invention applied thereto, Figure 2 a plan view of Figure 1, Figure 3 a front view of Figure 1 partly in section, and Figure 4 a section on line 4—4 of Figure 3.

Referring to the drawings, 1 indicates a jar having a neck 2, a shoulder 3 and a top 4. I provide a pair of projections 5 integral with the top 4 and having aligned notches 6 and slanting surfaces 7 merging into the top at opposite sides of the notches. A fastening yoke 8 made in sections 9 and 10 engages the notches 6 of the projections. Sections 9 and 10 are provided with threaded ends 11 which are connected by a threaded sleeve 12 having a hole 13 for receiving a pin or other suitable tool by which the sleeve may be turned. The threaded ends and the sleeve form a connection similar to a turnbuckle and will hereafter be referred to as a turnbuckle. The projections keep the turnbuckle spaced from the top to allow adjustment of the yoke while in the locked position. The ends 14 of fastening yoke 8 are bent into a hook shape and pivoted to a locking yoke 15, the hook ends 14 locking the sections 9 and 10 of yoke 8 against outward movement relatively to locking yoke 15. Locking yoke 15 is provided with a lip 16 and may have its arms 17 pivoted directly to a jar, or indirectly so long as the arms 17 are pivoted and held against outward movement relatively to the jar. The construction for pivoting the arms 17 shown in the drawings consists of a band 18 having bulged parts 19 provided with a hole 20 for receiving bent ends 21 of arms 17. The bent ends are provided with an upturned part 22 which engages the inside of the bulged parts and prevents arms 17 from moving outward. The band is secured to the jar by a tongue 23, on one of its ends, passing through an opening 24 in the other end and folded on itself as shown at 25 in Figure 4. The upper edge of the band engages the shoulder 3 and is prevented from sliding upward.

To use my improved device for fastening a top to a jar the top is placed on the jar in the usual manner and the fastening yoke 8 is slid over slanting surfaces 7 until it engages notches 6. Locking yoke 15 is then pressed downward to the position shown in Figure 1. If the pressure of the fastening yoke 8 is not sufficient to make a seal between the top and the jar the locking yoke is raised to its unlocking position by placing the finger under lip 16 so that the turnbuckle may be turned to bring the sections 9 and 10 together and thereby shorten the fastening yoke. The locking yoke is then pressed downward as before, into the position shown in Figure 1. If the jars leak after being sealed, more pressure may be applied to stop the leak by turning turnbuckle 12 while the yoke is in the locked position without breaking the seal or allowing air to come in contact with the contents of the jar.

A fastening device constructed as above set forth may be adjusted to produce any desired pressure on the jar top for making a seal, and may be readily fastened or unfastened by a slight movement of the fingers.

By forming the projections 5 on the jar top adjacent its edges, the strain on the top is all near the edges and not the center, thereby preventing the jar top from breaking when placed under great pressure.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In combination with a top and jar; projections on the top having aligned notches; a sectional fastening yoke engaging within the notches; means adjustably connecting the sections between the projections, and means on the jar connected with the fastening yoke for locking it in position, the first-named means being spaced from the top whereby it may be manipulated to adjust the yoke while in the locked position.

2. In combination with a top and jar; projections on the top having aligned notches and slanting surfaces at opposite sides of the notches merging into the top; a sectional fastening yoke adapted to slide over the surfaces into engagement with the notches; means adjustably connecting the sections between the projections, and means on the jar connected with the fastening yoke for locking it in position, the first-named means being spaced from the top whereby it may be manipulated to adjust the yoke while in the locked position.

3. In combination with a top and jar; projections on the top having aligned notches; a sectional fastening yoke engaging within the notches; a turnbuckle adjustably connecting the sections between the projections, and means on the jar connected with the fastening yoke for locking it in position, the turnbuckle being spaced from the top whereby it may be manipulated to adjust the yoke while in the locked position.

In testimony whereof I have signed my name to this specification in the presence of two subscribing witnesses.

LEWIS O. CULVER.

Witnesses:
MERTON A. SPIEGEL,
F. D. REBER.